(12) United States Patent
Cho

(10) Patent No.: US 9,311,018 B2
(45) Date of Patent: *Apr. 12, 2016

(54) HYBRID STORAGE SYSTEM FOR A MULTI-LEVEL RAID ARCHITECTURE

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 575 days.

This patent is subject to a terminal disclaimer.

(21) Appl. No.: 12/777,315

(22) Filed: May 11, 2010

(65) Prior Publication Data

US 2011/0283047 A1    Nov. 17, 2011

(51) Int. Cl.
*G06F 12/16* (2006.01)
*G06F 3/06* (2006.01)

(52) U.S. Cl.
CPC .............. *G06F 3/0659* (2013.01); *G06F 3/061* (2013.01); *G06F 3/0685* (2013.01)

(58) Field of Classification Search
USPC .......................................................... 711/103
See application file for complete search history.

(56) References Cited

U.S. PATENT DOCUMENTS

| | | | |
|---|---|---|---|
| 8,250,283 B1* | 8/2012 | Lee et al. ....................... | 711/100 |
| 2002/0124139 A1* | 9/2002 | Baek et al. .................... | 711/114 |
| 2004/0037120 A1* | 2/2004 | Uysal et al. ................... | 365/200 |
| 2004/0177218 A1* | 9/2004 | Meehan et al. ............... | 711/114 |
| 2005/0027919 A1* | 2/2005 | Aruga ........................... | 710/316 |
| 2005/0182898 A1* | 8/2005 | Davis et al. ................... | 711/114 |
| 2006/0004957 A1* | 1/2006 | Hand et al. ................... | 711/113 |
| 2006/0031422 A1* | 2/2006 | Totolos, Jr. ................... | 709/219 |
| 2007/0022241 A1* | 1/2007 | Sinclair ........................ | 711/100 |
| 2008/0141059 A1* | 6/2008 | Kim et al. .................... | 713/400 |
| 2008/0263302 A1* | 10/2008 | Balluchi et al. ............... | 711/167 |
| 2009/0119449 A1* | 5/2009 | Nagaram Chengal ........ | 711/103 |
| 2010/0008175 A1* | 1/2010 | Sweere et al. ................ | 365/229 |
| 2010/0037017 A1* | 2/2010 | Ryu et al. ..................... | 711/112 |
| 2010/0049914 A1* | 2/2010 | Goodwin ...................... | 711/114 |
| 2010/0185815 A1* | 7/2010 | Caulkins ....................... | 711/114 |
| 2010/0199036 A1* | 8/2010 | Siewert et al. ................ | 711/112 |
| 2010/0241799 A1* | 9/2010 | Schuette ....................... | 711/104 |
| 2010/0281230 A1* | 11/2010 | Rabii et al. ................... | 711/165 |
| 2011/0035548 A1* | 2/2011 | Kimmel et al. ............... | 711/114 |
| 2011/0246716 A1* | 10/2011 | Frame et al. .................. | 711/114 |
| 2012/0005418 A1* | 1/2012 | Ribeiro et al. ............... | 711/103 |
| 2012/0030415 A1* | 2/2012 | Selfin et al. .................. | 711/103 |

* cited by examiner

*Primary Examiner* — Kaushikkumar Patel
(74) *Attorney, Agent, or Firm* — Saliwanchik, Lloyd & Eisenschenk

(57) ABSTRACT

Disclosed is a hybrid storage system, which can include a hybrid RAID controller coupled to a system control board. Coupled to the hybrid RAID controller are a DDR RAID controller and a HDD/Flash RAID controller. A set of DDR RAID control blocks are coupled to the DDR RAID controller, each of the set of DDR RAID control blocks can include a set of DDR memory disks. Further, a set of HDD RAID control blocks are coupled to the HDD/Flash RAID controller, each of the set of HDD RAID control blocks can include a set of HDD/Flash SSD Units.

5 Claims, 4 Drawing Sheets

HYBRID STORAGE SYSTEM FOR A MULTI-LEVEL RAID ARCHITECTURE

CROSS-REFERENCE TO RELATED APPLICATION

This application is related in some aspects to commonly-owned, co-pending application Ser. No. 12/758,937, entitled SEMICONDUCTOR STORAGE DEVICE", filed on Apr. 13, 2010, the entire contents of which are herein incorporated by reference.

FIELD OF THE INVENTION

The present invention relates to a hybrid storage system for a multi-level RAID architecture.

BACKGROUND OF THE INVENTION

As the need for more computer storage grows, more efficient solutions are being sought. As is known, there are various hard disk solutions that store/read data in a mechanical manner as a data storage medium. Unfortunately, data processing speed associated with hard disks is often slow. Moreover, existing solutions still use interfaces that cannot catch up with the data processing speed of memory disks having high-speed data input/output performance as an interface between the data storage medium and the host. Therefore, there is a problem in the existing area in that the performance of the memory disk cannot be property utilized.

SUMMARY OF THE INVENTION

Embodiments of the present invention provide a hybrid storage system for a multi-level RAID architecture. Specifically, embodiments of this invention provide a hybrid RAID controller coupled to a system control board. Coupled to the hybrid RAID controller are a DDR RAID controller and a HDD/Flash RAID controller. A set of DDR RAID control blocks are coupled to the DDR RAID controller, each of the set of DDR RAID control blocks include a set of DDR memory disks. Further, a set of HDD RAID control blocks are coupled to the HDD/Flash RAID controller, each of the set of HDD RAID control blocks include a set of HDD/Flash SSD Units.

A first aspect of the present invention provides a hybrid storage system for a multi-level RAID architecture, comprising: a hybrid RAID controller coupled to a system control board; a DDR RAID controller coupled to the hybrid RAID controller; a set of DDR RAID control blocks coupled to the DDR RAID controller, each of the set of DDR RAID control blocks comprising a set of DDR memory disks; a HDD RAID controller coupled to the hybrid RAID controller; and a set of HDD RAID control blocks coupled to the HDD RAID controller, each of the set of HDD RAID control blocks comprising a set of HDD/Flash SSD Units.

A second aspect of the present invention provides a hybrid storage system for a multi-level RAID architecture, comprising: a hybrid RAID controller coupled to a system control board; a DDR RAID controller coupled to the hybrid RAID controller; a set of DDR RAID control blocks coupled to the DDR RAID controller, each of the set of DDR RAID control blocks comprising a set of DDR memory disks and a PCI-Express RAID controller; a HDD RAID controller coupled to the hybrid RAID controller; and a set of HDD RAID control blocks coupled to the HDD RAID controller, each of the set of HDD RAID control blocks comprising a set of HDD/Flash SSD Units, and a PCI-Express RAID controller.

A third aspect of the present invention provides a method for providing hybrid storage system for a multi-level RAID architecture, comprising: coupling a hybrid RAID controller to a system control board; coupling a DDR RAID controller to the hybrid RAID controller; coupling a set of DDR RAID control blocks to the DDR RAID controller, each of the set of DDR RAID control blocks comprising a set of DDR memory disks; coupling a HDD RAID controller to the hybrid RAID controller; and coupling a set of HDD RAID control blocks to the HDD RAID controller, each of the set of HDD RAID control blocks comprising a set of HDD/Flash SSD Units.

BRIEF DESCRIPTION OF THE DRAWINGS

These and other features of this invention will be more readily understood from the following detailed description of the various aspects of the invention taken in conjunction with the accompanying drawings in which.

Figure 1:
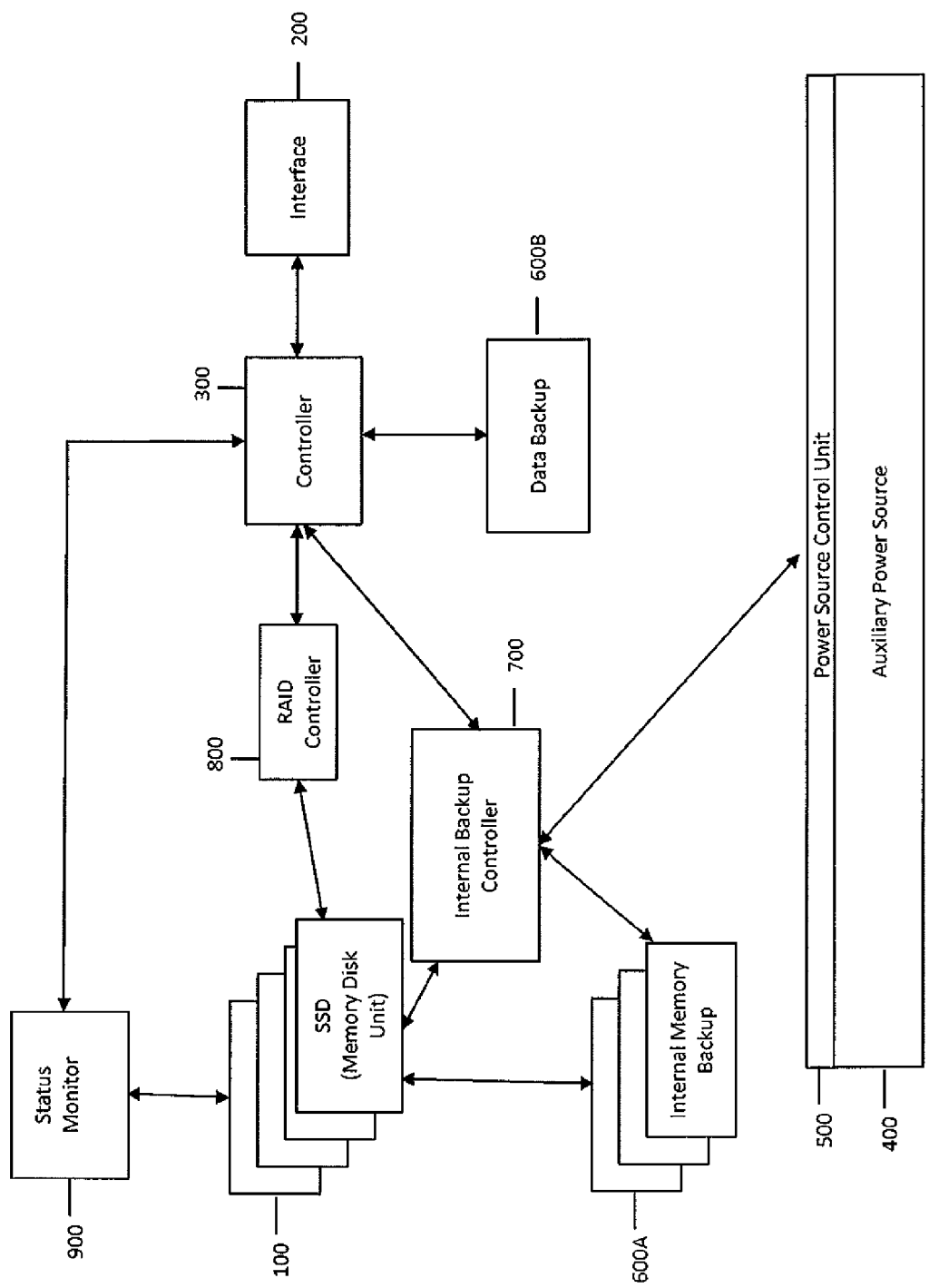
FIG. 1 is a diagram schematically illustrating a configuration of a RAID controlled storage device of a PCI-Express (PCI-e) type according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Exemplary embodiments now will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc. do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. The term SSD means semiconductor storage device. The term DDR means double data rate. Still yet, the term HDD means hard disk drive.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a serial attached small computer system interface/serial advanced technology attachment (PCI-Express) type according to an embodiment will be described in detail with reference to the accompanying drawings.

As indicated above, embodiments of the present invention provide a hybrid storage system for a multi-level RAID architecture. Specifically, embodiments of this invention provide a hybrid RAID controller coupled to a system control board. Coupled to the hybrid RAID controller are a double data rate (DDR) RAID controller and a HDD/Flash RAID controller. A set of DDR RAID control blocks are coupled to the DDR RAID controller, each of the set of DDR RAID control blocks include a set of DDR memory disks. Further, a set of hard disk drive (HDD) RAID control blocks are coupled to the HDD/Flash RAID controller, each of the set of HDD RAID control blocks include a set of HDD/Flash SSD Units.

The storage device of a serial attached small computer system interface/serial advanced technology attachment (PCI-Express) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

Referring now to FIG. 1, a diagram schematically illustrating a configuration of a PCI-Express type, RAID controlled storage device (e.g., for providing storage for a serially attached computer device) according to an embodiment of the invention is shown. As depicted, FIG. 1 shows a RAID controlled PCI-Express type storage device according to an embodiment of the invention which includes a memory disk unit 100 comprising: a plurality of memory disks having a plurality of volatile semiconductor memories (also referred to herein as high-speed SSDs 100); a RAID controller 800 coupled to SSDs 100; an interface unit 200 (e.g., PCI-Express host) which interfaces between the memory disk unit and a host; a controller unit 300; an auxiliary power source unit 400 that is charged to maintain a predetermined power using the power transferred from the host through the PCI-Express host interface unit; a power source control unit 500 that supplies the power transferred from the host through the PCI-Express host interface unit to the controller unit, the memory disk unit, the backup storage unit, and the backup control unit which, when the power transferred from the host through the PCI-Express host interface unit is blocked or an error occurs in the power transferred from the host, receives power from the auxiliary power source unit and supplies the power to the memory disk unit through the controller unit; a backup storage unit 600 that stores data of the memory disk unit; and a backup control unit 700 that backs up data stored in the memory disk unit in the backup storage unit, according to an instruction from the host or when an error occurs in the power transmitted from the host.

The memory disk unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The memory disk unit 100 may have a configuration in which the memory disks are arrayed in parallel.

The PCI-Express host interface unit 200 interfaces between a host and the memory disk unit 100. The host may be a computer system or the like, which is provided with a PCI-Express interface and a power source supply device.

The controller unit 300 adjusts synchronization of data signals transmitted/received between the PCI-Express host interface unit 200 and the memory disk unit 100 to control a data transmission/reception speed between the PCI-Express host interface unit 200 and the memory disk unit 100.

Figure 2:
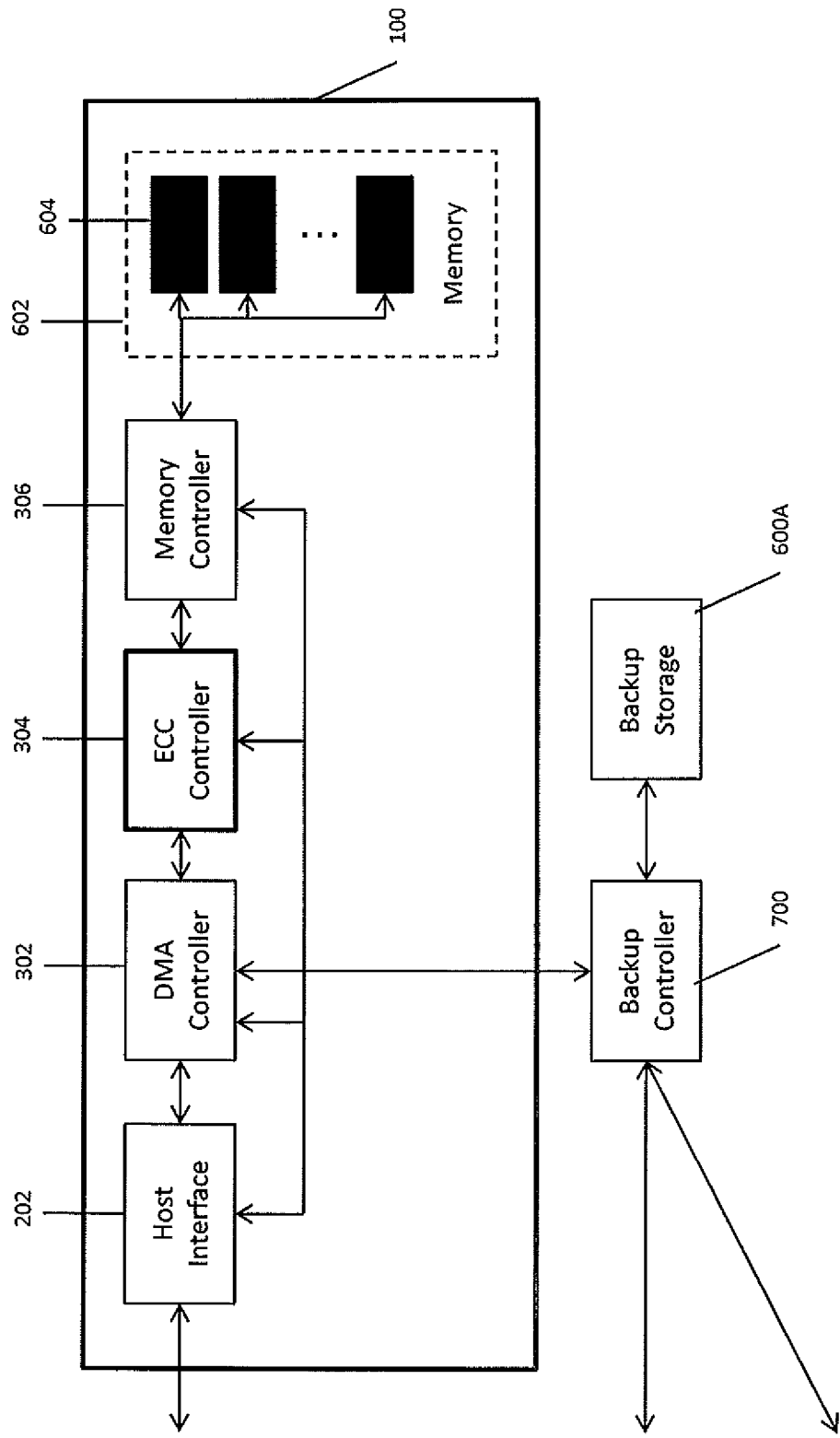
FIG. 2 is a more specific diagram of a RAID controller coupled to a set of SSDs.
Figure 3:
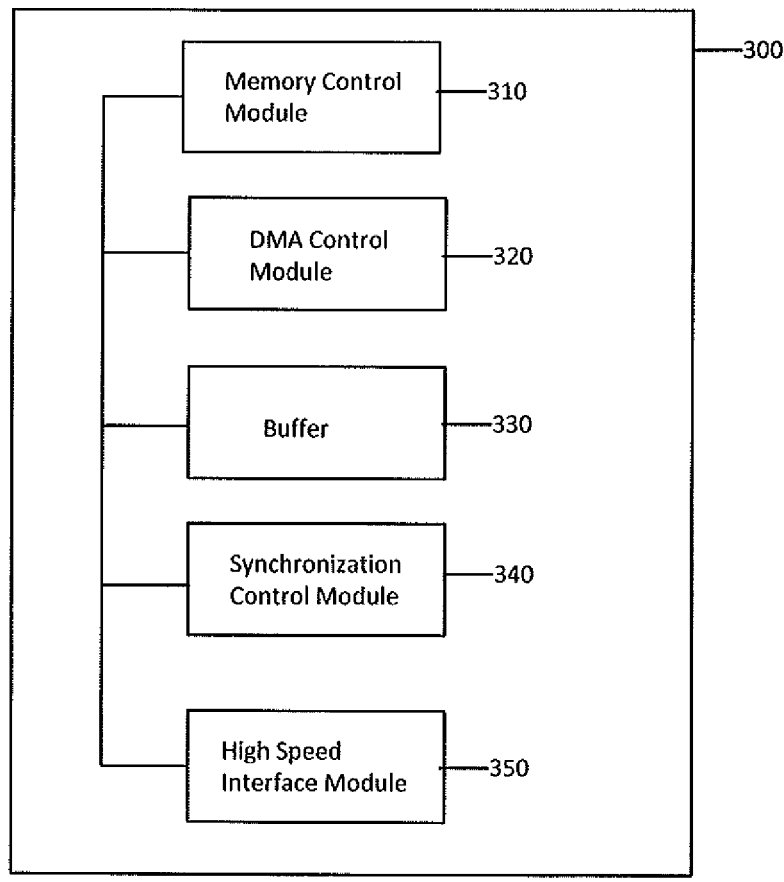
FIG. 3 is a diagram schematically illustrating a configuration of the high-speed SSD of FIG. 1.

Referring now to FIG. 2, a more detailed diagram of a RAID controlled SSD is shown. As depicted, a PCI-e type RAID controller 800 can be directly coupled to any quantity of SSDs 100. Among other things, this allows for optimum control of SSDs 100. Among other things, the use of a RAID controller 800:

1. Supports the current backup/restore operations.
2. Provides additional and improved backup function by performing the following:
   a) the internal backup controller determines the backup (user's request order or the status monitor detects power supply problems);
   b) the internal backup controller requests a data backup to SSDs;
   c) the internal backup controller requests internal backup device to backup data immediately;
   d) monitors the status of the backup for the SSDs and internal backup controller; and
   e) reports the internal backup controller's status and end-op.
3. Provides additional and improved restore function by performing the following:
   a) the internal backup controller determines the restore (user's request order or the status monitor detects power supply problems);
   b) the internal backup controller requests a data restore to the SSDs;
   c) the internal backup controller requests internal backup device to restore data immediately;
   d) monitors the status of the restore for the SSDs and internal backup controller; and
   e) reports the internal backup controller status and end-op.

Referring still to FIG. 2, a diagram schematically illustrating a configuration of the high-speed SSD 100 is shown. As depicted, SSD/memory disk unit 100 comprises: a host interface 202 (e.g., PCI-Express host) (which can be interface 200 of FIG. 1, or a separate interface as shown); a DMA controller 302 interfacing with a backup control module 700; an ECC controller; and a memory controller 306 for controlling one or more blocks 604 of memory 602 that are used as high-speed storage.

Figure 4:
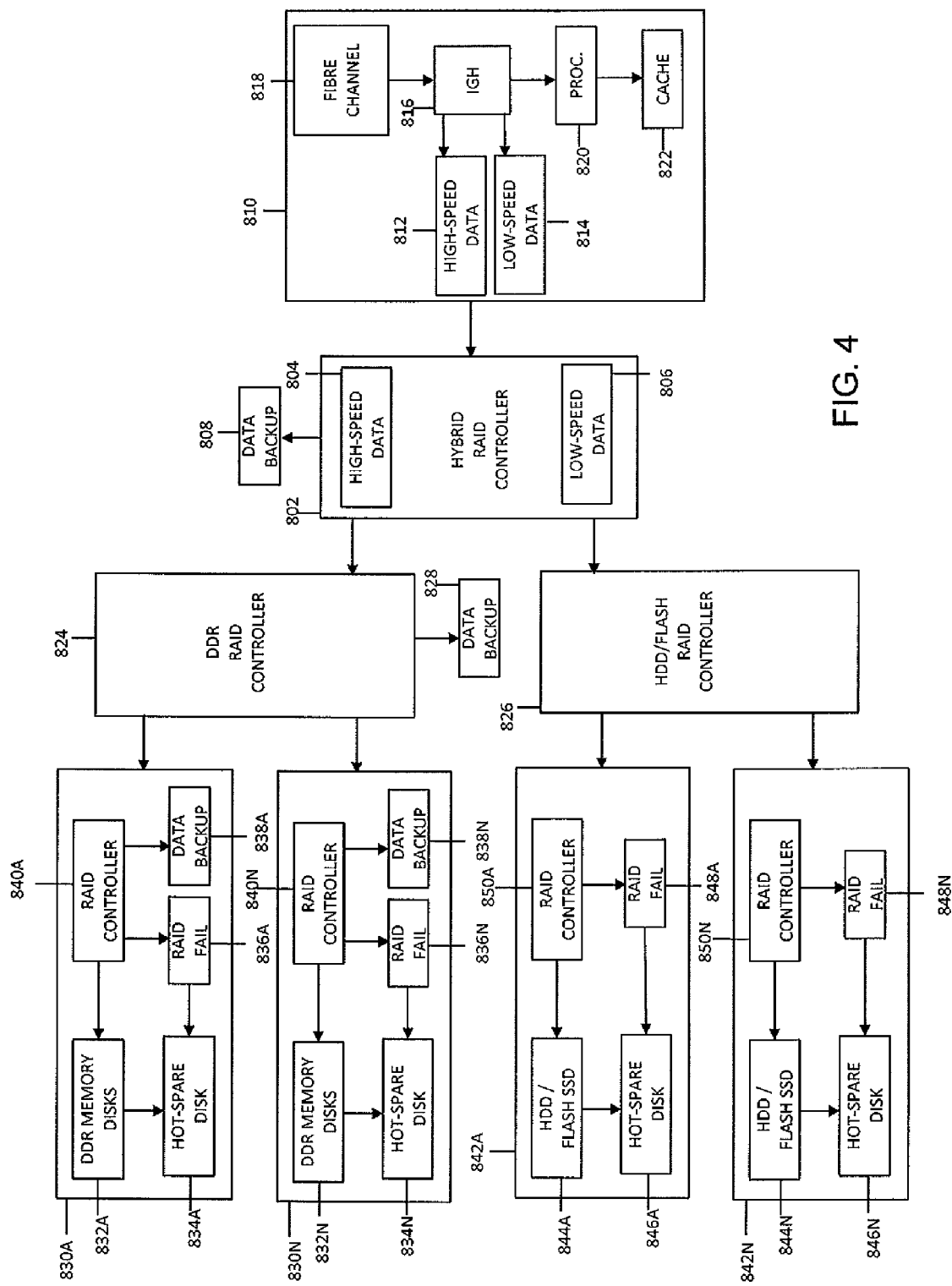
FIG. 4 is a diagram schematically illustrating the hybrid storage system for a multi-level RAID architecture according to an embodiment of the present invention.

Referring now to FIG. 4, a hybrid storage system for a multilevel RAID architecture according to an embodiment of the present invention is shown. As depicted, the architecture includes a hybrid RAID controller 802 coupled to a system control board 810. Coupled to the hybrid RAID controller 802 is a DDR RAID controller 824 and a HDD/Flash RAID controller 826. A set (at least one) of DDR RAID control blocks 830A-N are coupled to DDR RAID controller 824. AS shown, each of the set of DDR RAID control blocks 830A-N comprises: a set of DDR memory disks 832A-N; a hot spare disk 834A coupled to the set of DDR memory disks; a (PCI-E to PCI-E) RAID controller 840A-N coupled to the set of DDR memory disks 832A-N; a RAID fail component 836A-N coupled to the RAID controller 840A-N; and a data backup component 838A-N coupled to the RAID controller 840A-N.

Coupled to the HDD/Flash RAID controller 826 are a set (at least one) of HDD RAID control blocks 842A-N. Each of the set of HDD RAID control blocks 842A-N comprises: a set of HDD/Flash SSD Units 844A-N; a hot spare disk 846A-N couples to the set of HDD/Flash SSD Units 844A-N; a (PCI-E) RAID controller 850A-N coupled to the set of HDD/Flash SSD Units 844A-N; and a RAID fail component 848A-N coupled to the RAID controller 850A-N.

As further shown in FIG. 4, hybrid RAID controller 802 comprises: a high-speed data controller 804; and a low-speed data controller 806. A data backup component 808 is shown coupled to hybrid RAID controller 802. System control board 810 generally comprises: a chip (e.g., IGH) 816; a high-speed data controller 812 coupled to the chip 816; a low-speed data controller 814 coupled to the chip 816; a fibre channel chip 818 coupled to the chip 816; a processor 820 coupled to the chip 816; and cache memory 822 coupled to the processor 822.

Referring back to FIG. 1, auxiliary power source unit 400 may be configured as a rechargeable battery or the like, so that it is normally charged to maintain a predetermined power using power transferred from the host through the PCI-Express host interface unit 200 and supplies the charged power to the power source control unit 500 according to the control of the power source control unit 500.

The power source control unit 500 supplies the power transferred from the host through the PCI-Express host interface unit 200 to the controller unit 300, the memory disk unit 100, the backup storage unit 600, and the backup control unit 700.

In addition, when an error occurs in a power source of the host because the power transmitted from the host through the PCI-Express host interface unit 200 is blocked, or the power transmitted from the host deviates from a threshold value, the power source control unit 500 receives power from the auxiliary power source unit 400 and supplies the power to the memory disk unit 100 through the controller unit 300.

The backup storage unit 600 is configured as a low-speed non-volatile storage device such as a hard disk and stores data of the memory disk unit 100.

The backup control unit 700 backs up data stored in the memory disk unit 100 in the backup storage unit 600 by controlling the data input/output of the backup storage unit 600 and backs up the data stored in the memory disk unit 100 in the backup storage unit 600 according to an instruction from the host, or when an error occurs in the power source of the host due to a deviation of the power transmitted from the host deviates from the threshold value.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The present invention supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A hybrid storage system for a multi-level RAID architecture, comprising:
   a hybrid RAID controller coupled to a system control board;
   a DDR RAID controller coupled to the hybrid RAID controller;
   a main data backup component directly coupled to the DDR RAID controller;
   a set of DDR RAID control blocks coupled to the DDR RAID controller, each of the set of DDR RAID control blocks comprising a set of DDR memory disks;
   a HDD RAID controller coupled to the hybrid RAID controller; and
   a set of HDD RAID control blocks coupled to the HDD RAID controller, each of the set of HDD RAID control blocks comprising a set of HDD/Flash SSD Units,
   wherein each of the set of DDR RAID control blocks further comprises:
      a hot spare disk coupled to the set of DDR memory disks;
      a RAID controller coupled to the set of DDR memory disks;
      a RAID fail component coupled to the RAID controller of the DDR RAID control block and to the hot spare disk; and
      a DDR RAID control block data backup component coupled to the RAID controller of the DDR RAID control block;
   wherein each of the set of HDD RAID control blocks further comprises:
      a hot spare disk coupled to the set of HDD/Flash SSD Units;
      a RAID controller coupled to the set of HDD/Flash SSD Units; and a RAID fail component coupled to the RAID controller of the HDD RAID control block and to the hot spare disk, wherein the system control board comprises cache memory connected to an interface, wherein the set of DDR memory disks are volatile semiconductor memories, wherein the hybrid RAID controller comprises a first high-speed data controller connected to the DDR RAID controller and a first low-speed data controller connected to the HDD RAID controller, and wherein the system control board comprises:
  a chip;
  a second high-speed data controller coupled to the chip;
  a second low-speed data controller coupled to the chip;
  a fibre channel chip coupled to the chip;
  a processor coupled to the chip; and
  the cache memory coupled to the processor.

2. The hybrid storage system of claim 1, the RAID controller of each of the set of DDR RAID control blocks comprising a PCI-Express RAID controller.

3. The hybrid storage system of claim 1, the RAID controller of each of the set of HDD RAID control blocks comprising a PCI-Express RAID controller.

4. A hybrid storage system for a multi-level RAID architecture, comprising:
  a hybrid RAID controller coupled to a system control board;
  a DDR RAID controller coupled to the hybrid RAID controller;
  a main data backup component directly coupled to the DDR RAID controller;
  a set of DDR RAID control blocks coupled to the DDR RAID controller, each of the set of DDR RAID control blocks comprising a set of DDR memory disks and a PCI-Express RAID controller;
  a HDD RAID controller coupled to the hybrid RAID controller; and
  a set of HDD RAID control blocks coupled to the HDD RAID controller, each of the set of HDD RAID control blocks comprising a set of HDD/Flash SSD Units, and a PCI-Express RAID controller, wherein each of the set of DDR RAID control blocks further comprises:
  a hot spare disk coupled to the set of DDR memory disks;
  a RAID fail component coupled to the RAID controller of the DDR RAID control block and to the hot spare disk; and
  a DDR RAID control block data backup component coupled to the RAID controller of the DDR RAID control block;

wherein each of the set of HDD RAID control blocks further comprises:
  a hot spare disk coupled to the set of HDD/Flash SSD Units; and
  a RAID fail component coupled to the RAID controller of the HDD RAID control block and to the hot spare disk;

wherein the system control board comprises cache memory connected to an interface, wherein the set of DDR memory disks are volatile semiconductor memories, wherein the hybrid RAID controller comprises a first high-speed data controller connected to the DDR RAID controller and a first low-speed data controller connected to the HDD RAID controller, and wherein the system control board comprises:
  a chip;
  a second high-speed data controller coupled to the chip;
  a second low-speed data controller coupled to the chip;
  a fibre channel chip coupled to the chip;
  a processor coupled to the chip; and
  the cache memory coupled to the processor.

5. A method for providing a hybrid storage system for a multi-level RAID architecture, comprising:
  coupling a hybrid RAID controller to a system control board;
  coupling a DDR RAID controller to the hybrid RAID controller;
  coupling a main data backup component directly to the DDR RAID controller;
  coupling a set of DDR RAID control blocks to the DDR RAID controller, each of the set of DDR RAID control blocks comprising a set of DDR memory disks;
  coupling an HDD RAID controller to the hybrid RAID controller; and
  coupling a set of HDD RAID control blocks to the HDD RAID controller, each of the set of HDD RAID control blocks comprising a set of HDD/Flash SSD Units, wherein each of the set of DDR RAID control blocks further comprises:
  a hot spare disk coupled to the set of DDR memory disks;
  a PCI-Express RAID controller coupled to the set of DDR memory disks;
  a RAID fail component coupled to the RAID controller of the DDR RAID control block and to the hot spare disk; and
  a DDR RAID control block data backup component coupled to the RAID controller of the DDR RAID control block;

wherein each of the set of HDD RAID control blocks further comprises:
  a hot spare disk coupled to the set of HDD/Flash SSD Units;
  a PCI-Express RAID controller coupled to the set of HDD/Flash SSD Units; and
  a RAID fail component coupled to the RAID controller of the HDD RAID control block and to the hot spare disk;

wherein the system control board comprises cache memory connected to an interface, wherein the set of DDR memory disks are volatile semiconductor memories, wherein the hybrid RAID controller comprises a first high-speed data controller connected to the DDR RAID controller and a first low-speed data controller connected to the HDD RAID controller, and wherein the system control board comprises:
  a chip;
  a second high-speed data controller coupled to the chip;
  a second low-speed data controller coupled to the chip;
  a fibre channel chip coupled to the chip;
  a processor coupled to the chip; and
  the cache memory coupled to the processor.

* * * * *